Figure 1:
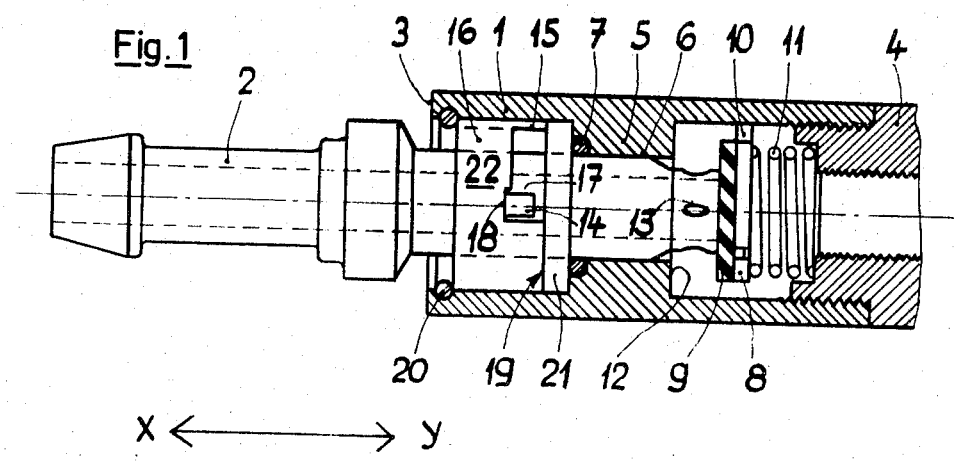

United States Patent [19]
Oetiker

[11] 3,858,910
[45] Jan. 7, 1975

[54] ROTATABLE BAYONNET-TYPE COUPLING
[76] Inventor: Hans Oetiker, 21 Oberdorfstrasse, Horgen, Switzerland
[22] Filed: Apr. 10, 1973
[21] Appl. No.: 349,726

[30] Foreign Application Priority Data
Apr. 10, 1972 Switzerland............... 5197/72

[52] U.S. Cl.............. 285/84, 251/89.5, 251/354, 285/98, 285/279, 285/376, 403/78, 403/165, 403/349
[51] Int. Cl............................................. F16l 55/00
[58] Field of Search....... 285/84, 98, 279, 361, 376, 285/85, 86, 307, 280, 281, 377, 272, 275, 285/396, 402, 33, 34, 35, 273, 278; 403/78, 403/165, 349, 164; 248/216, 220.5, 223

[56] References Cited
UNITED STATES PATENTS
2,248,701  7/1941  Fowler.............................. 285/84 X
2,684,268  7/1954  Hjulian........................... 251/348 X
2,795,438  6/1957  Oetiker......................... 285/376 X Primary Examiner—Jordan Franklin
Assistant Examiner—Moshe I. Cohen
Attorney, Agent, or Firm—Craig & Antonelli

[57] ABSTRACT
A pipe coupling which includes a housing and a nipple that is provided with locking lugs distributed over the circumference which engage in locking grooves of a grooved socket provided in the housing; the locking grooves thereby extend at first essentially in the axial direction and then essentially in the circumferential direction and are provided at the end of the circumferential section with a notch recessed in the direction toward the end face of the housing on the side of the nipple whereby a locking spring forces the locking lugs into the notches in the completely coupled condition; the grooved socket is thereby freely rotatably arranged within the housing about the axis thereof and is axially fixed with respect to the housing.

10 Claims, 2 Drawing Figures

X ←——→ y

ROTATABLE BAYONNET-TYPE COUPLING

The present invention relates to a pipe coupling including a housing and a nipple provided with locking lugs distributed over the circumferences thereof which during the coupling operation are received by locking grooves of the housing, which, as viewed from the nipple-side end face of the housing, initially extend essentially in the axial direction and thereafter essentially in the circumferential direction and which are provided at the end of the circumferential section with a notch directed toward the end face of the housing, whereby a locking spring of the housing forces the locking lugs into the notches in the coupled-up condition.

In prior art pipe couplings, the housing and the nipple are non-rotatably connected together with respect to each other in the fully coupled condition. This is disadvantageous in particular if one of the two coupling parts is connected with a hose, and it would be desirable for avoiding or removing hose loops that the two coupling parts are rotatable with respect to one another. Even though intermediate pieces are known in the art, whose two parts are rotatable with respect to each other, such additional intermediate parts entail additional costs, greater over-all dimensions and at least one additional detachable connection with sealing problems and assembly costs.

The present invention is concerned with the task to provide a simple and space-saving bayonnet-type pipe coupling whose two parts are mutually rotatable. To that end, a pipe coupling of the type described hereinabove is characterized in that a grooved socket is provided which is freely rotatable within the housing about the axis thereof and is axially fixed with respect to the housing; the grooved socket is thereby provided with the locking grooves. It is achieved by this measure that the nipple, which in the coupled-up condition is axially fixedly and non-rotatably connected with the grooved socket, is able nonetheless to rotate with respect to the housing about the axis thereof since the grooved socket, is rotatable with respect to the housing about the axis thereof.

In order to assure a safe and reliable uncoupling, according to a special feature of the present invention, the fit between the grooved sleeve-like socket and the housing is made closer than the fit between the grooved sleeve-like socket and the nipple. It is assured by this measure that the locking lugs of the nipple move in the sections of the locking grooves extending in the circumferential direction without taking along the grooved sleeve-like socket, freely rotatable as such, so that the locking lugs can reach safely and reliably the sections of the locking grooves extending in the axial direction.

According to another special type of construction of the present invention, the grooved socket includes two axial parts, of which the annular part remote from the nipple-side end face of the housing is constructed as annular washer-like disk and whose grooved sleeve-like part adjacent the nipple-side end face of the housing accommodates the locking grooves whereby the sections of the locking grooves extending in the circumferential direction are constructed as recesses in that end face of the grooved part nearer the nipple-side end face of the housing which faces the annular washer-like disc and the boundary surfaces of the sections of the locking grooves extending in the circumferential direction, which are disposed opposite the nipple-side and face of the housing, are constituted by the annular washer-like part. These measures enable a considerable decrease of the manufacturing costs and also a reduction of the manufacturing time required therefor. A further advasntage results from the fact that different materials can be used for the two axial parts of the grooved sleeve-like socket structure.

According to a further feature of the present invention, the unitary grooved sleeve-like socket consists of synthetic plastic material of any known type and the remaining parts of metal. This measure permits an extraordinarily inexpensive manufacture and results in a wear-resistant and corrosion-resistant construction.

If the pipe carries a corrosive medium, all of the parts of the coupling are made of a corrosion-resistant material, for example, of an alloyed steel or of synthetic plastic material.

In one embodiment with a two-partite grooved socket, according to a special construction of the present invention the annular part consists of non-ferrous metal and the grooved sleeve-like part of synthetic plastic material. This measure results in high insensitivity of the annular part against the considerable thrusts and impacts of the locking lugs which occur during the coupling operation whereby the manufacture of the grooved part from synthetic plastic material is particularly simple and cost-saving.

Accordingly, it is an object of the present invention to provide a rotatable bayonnet-type pipe coupling which avoids by simple means the aforementioned shortcomings and drawbacks encountered in the prior art.

Another object of the present invention resides in a pipe coupling of the type described above which permits a rotation of the coupling parts with respect to each other.

A further object of the present invention resides in a pipe coupling enabling mutual rotation between the two coupling parts which is relatively inexpensive in manufacture and assembly, yet is highly reliable in operation.

Another object of the present invention resides in a bayonnet-type pipe coupling which is simple in construction and requires relatively little space, also eliminating the need for additional parts.

A further object of the present invention resides in a pipe coupling of the type described above which permits a decrease in the time required for its production as well as a decrease in the manufacturing costs connected therewith.

A still further object of the present invention resides in a pipe coupling which permits the use of different materials for the two axial parts of its grooved socket structure thereby permitting the requirements made thereof as regards wear and corrosion-resistance to be taken fully into consideration.

Still another object of the present invention resides in a bayonnet-type pipe coupling of the type described above which is robust as well as insensitive to abuse.

Figure 2:
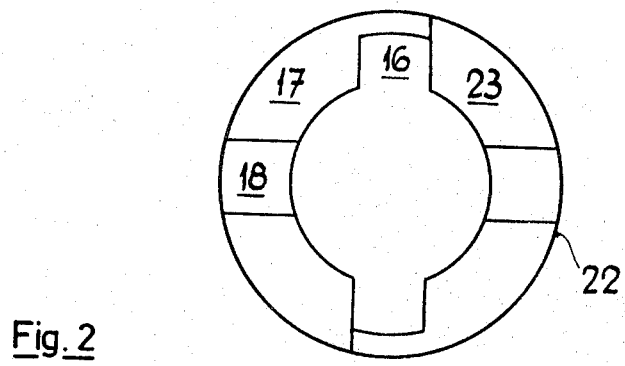

These and further objects, features and advantages of the present invention will become more apparent from the following description when taken in connection with the accompanying drawing which shows, for purposes of illustration only, one embodiment in accordance with the present invention, and wherein:

FIG. 1 is an axial cross-sectional view through a bayonnet-type pipe coupling of the present invention constructed as rapid coupling; and FIG. 2 is an end elevational view, on an enlarged scale, of a detail of the coupling according to FIG. 1.

Referring now to the drawing wherein like reference numerals are used throughout the two views to designate like parts, the pipe coupling illustrated in the two figures includes a housing 1 and a nipple 2 inserted into the housing 1 and illustrated in the coupled-up condition. A plug 4 is screwed into the housing 1 at the end thereof opposite the nipple-side end face 3 of the housing; the plug 4 is provided with an internal thread which is intended to receive a connecting nipple (not shown) for a pipe line or a hose. The nipple 2 is constructed for receiving a hose (not shown). The housing 1 is provided in its axial center with a radial wall 5 having a coaxial bore 6, in which the nipple 2 is radially guided, whereby a ring seal 7 seals the nipple 2 with respect to the housing 1. At its right end, as viewed in FIG. 1 of the drawing, the nipple 2 forces a valve body 8 with a sealing disk 9 into its open position in the direction of the arrow Y. The valve body 8 is guided within the housing 1 by three projections 10 distributed over the circumference thereof. In the uncoupled condition, the valve body 8 is forced by a spring 11 constituting simultaneously a valve and locking spring in the direction of the arrow X against the end face 12 of the radial wall 5. In the coupling condition, the nipple 2 forces the locking spring 11 in the direction of the arrow Y. The nipple 2 is provided at its right end, as viewed, in the drawing, with four apertures 13 distributed over its circumference so that the inside of the nipple 2 is in communication with the portion of the interior of the housing 1 which is located to the right of the radial wall 5 as viewed in FIG. 1. The nipple 2 is provided with two locking lugs 14 displaced by 180° with respect to each other. These locking lugs 14 are received by two locking grooves 15 which are also displaced with respect to each other by 180°. The locking grooves 15 are provided, as viewed from the end face 3 of the housing 1, i.e., in the direction of the arrow Y, with a section 16 extending in the axial direction and thereupon with a section 17 extending in the circumferential direction. At the end of the latter sections 17 the locking grooves 15 are each provided with a notch 18 pointing toward the end face 3 of the housing 1. In the coupled condition, the locking spring 11 forces the locking lugs 14 into the notches 18. The locking grooves 15 are provided in a grooved sleeve-like socket structure generally designated by reference numeral 19 which is freely rotatably arranged within the housing 1 about the axis thereof and is axially fixed with respect thereto. The grooved socket 19 is axially retained by the radial wall 5 and by a spring ring 20.

The grooved socket 19 includes two parts. The annular part 21 remote from the end face 3 of the housing 1 is constructed as an annular washerlike disk. The sleeve-like grooved part 22 adjacent the end face 3 of the housing 1 is provided with the locking grooves 15. FIG. 2 illustrates this grooved part 22 on a larger scale as viewed in elevational view in the direction of the arrow X, i.e., as viewed in the axial direction from the right end face in FIG. 1. The sections 17 of the locking grooves 15 which extend in the circumferential direction are constructed as recesses in the end face 23 of the grooved part 22 facing the annular part 21. The boundary surfaces of the sections 17 of the locking grooves 15, which point in a direction opposite the end face 3 of the housing 2, i.e., in the direction of arrow Y, are thereby formed by the annular part 21. The annular part 21 consists of a non-ferrous metal and the grooved part 22 of synthetic plastic material of any known type suitable for the particular application.

The valve 8 to 11 may also be omitted in which case the locking spring 11 would act by way of an annular washer against the right end of the nipple 2 as viewed in FIG. 1. The nipple 2 may also includes a valve mechanically actuated in the coupled condition or a valve actuated by a medium as known in the art.

The fit between the grooved part 22 of the grooved socket 19 and the housing 1 is made closer than the fit between the grooved part 22 of the grooved socket 19 and the nipple 2.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What is claimed is:

1. A pipe coupling which comprises grooved socket means contained within a housing means and a nipple means provided with locking lugs distributed over the circumference thereof which are received by locking groove means in said grooved socket means when coupling said nipple means to said housing means, said locking groove means each including a first section extending, as viewed from an end face of the housing means on the nipple-side, essentially in the axial direction and a second section adjoining said first section and extending essentially in the circumferential direction and being provided at the end of the circumferential section opposite where the axially extending section adjoins the first section with a notch means directed toward said end face of the housing means, and a locking spring means in said housing means which forces the locking lugs into said notch means in the coupled condition of said nipple means, characterized in that said grooved socket means is freely rotatable about the axis of the housing means and is axially fixed with respect to said housing means, said grooved socket means being provided with an axial opening, and said nipple means extending axially through said axial opening in said grooved socket means.

2. A pipe coupling according to claim 1, characterized in that the fit between the grooved socket means and the housing means is closer than the fit between the grooved socket means and the nipple means.

3. A pipe coupling according to claim 1, characterized in that the grooved socket means includes two axial parts, the part disposed further away from said end face of the housing means being constructed as annular disk while the other part disposed nearer the end face of the housing means is constructed as grooved part accommodating the locking groove means.

4. A pipe coupling according to claim 3, characterized in that said other part is in the form of a cylindrical sleeve.

5. A pipe coupling according to claim 3, characterized in that each second section of the locking groove means extending in the circumferential direction is formed as a recess in the end face of said grooved part which faces said annular part.

6. A pipe coupling according to claim 5, characterized in that the boundary surfaces of each second section of the locking groove means extending in the circumferential direction which is located on the side of the groove means opposite said end face of the housing means are formed by said annular part.

7. A pipe coupling according to claim 6, characterized in that said other part is in the form of a cylindrical sleeve.

8. A pipe coupling according to claim 6, characterized in that the fit between the grooved socket means and the housing means is closer than the fit between the groove socket means and the nipple means.

9. A pipe coupling according to claim 3, characterized in that said other part is made from synthetic plastic material.

10. A pipe coupling according to claim 9, characterized in that said one part consists of non-ferrous metal.

* * * * *